(12) United States Patent
Maul et al.

(10) Patent No.: US 9,796,530 B2
(45) Date of Patent: Oct. 24, 2017

(54) CYLINDER FOR CONVEYING PRINTED SHEETS ALONG A UV OR ELECTRON BEAM DRIER AND METHOD FOR CONVEYING PRINTED SHEETS

(71) Applicant: HEIDELBERGER DRUCKMASCHINEN AG, Heidelberg (DE)

(72) Inventors: Albert Maul, Heidelberg (DE); Jens Friedrichs, Neckargemuend (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 670 days.

(21) Appl. No.: 14/246,307

(22) Filed: Apr. 7, 2014

(65) Prior Publication Data
US 2014/0299448 A1    Oct. 9, 2014

(30) Foreign Application Priority Data
Apr. 5, 2013    (DE) .......................... 10 2013 005 913

(51) Int. Cl.
F26B 3/34    (2006.01)
F26B 21/06    (2006.01)
F26B 25/00    (2006.01)
B65G 13/02    (2006.01)
B41F 23/04    (2006.01)

(52) U.S. Cl.
CPC .......... B65G 13/02 (2013.01); B41F 23/0453 (2013.01)

(58) Field of Classification Search
CPC .. F26B 23/00; B41F 23/0409; B41F 23/0453; B41F 21/102; B41F 21/104; B41F 21/10; B65H 5/226; B65H 29/243; B65H 29/24; B65H 2406/33
USPC ................. 34/276, 275, 251, 191, 236, 242; 198/689.1, 471.1; 271/276, 196, 194; 101/246, 247, 408, 409, 485, 486, 411
See application file for complete search history.

(56) References Cited

U.S. PATENT DOCUMENTS

| | | | |
|---|---|---|---|
| 4,145,040 A * | 3/1979 | Huber | .................... B65H 5/226 271/195 |
| 7,374,167 B2 * | 5/2008 | Behrens | ................ G03F 7/2051 271/196 |
| 2007/0074387 A1 * | 4/2007 | Ieizumi | .............. H05K 13/0452 29/739 |

FOREIGN PATENT DOCUMENTS

| | | | | |
|---|---|---|---|---|
| DE | 29707190 U1 | 9/1997 | | |
| DE | 29819345 U1 | 3/1999 | | |
| DE | 10141755 A1 | 3/2002 | | |
| JP | H04145400 A * | 5/1992 | ............. | B41F 23/04 |
| JP | H04145400 A | 5/1992 | | |

* cited by examiner

*Primary Examiner* — Kenneth Rinehart
*Assistant Examiner* — John McCormack
(74) *Attorney, Agent, or Firm* — Laurence A. Greenberg; Werner H. Stemer; Ralph E. Locher

(57) ABSTRACT

A cylinder for conveying printed sheets along a UV or electron beam drier has inert-gas openings to which an inert gas is supplied at least temporarily during operation. A method for conveying printed sheets is also provided.

18 Claims, 3 Drawing Sheets

CYLINDER FOR CONVEYING PRINTED SHEETS ALONG A UV OR ELECTRON BEAM DRIER AND METHOD FOR CONVEYING PRINTED SHEETS

CROSS-REFERENCE TO RELATED APPLICATION

This application claims the priority, under 35 U.S.C. §119, of German Patent Application DE 10 2013 005 913.5, filed Apr. 5, 2013; the prior application is herewith incorporated by reference in its entirety.

BACKGROUND OF THE INVENTION

Field of the Invention

The present invention relates to a cylinder for conveying printed sheets along a UV or electron beam drier and a method for conveying printed sheets.

In printing processes, inks or varnishes are applied to printing substrates. Those inks or varnishes are cured by UV radiation or by electron beams.

German Utility Model DE 29 819 345 U1 discloses an inertization configuration wherein covers that are adjustable relative to the cylinder are provided. In addition, a cover device is provided that has protrusions on the front face relative to the cylinder.

German Utility Model DE 29 707 190 U1 describes an inertization configuration wherein sealing bars are adjustable relative to the cylinder. The cylinder has a cylinder gap with a circumferential-side cover, and the inertization space is subdivided by walls.

SUMMARY OF THE INVENTION

It is accordingly an object of the invention to provide a cylinder for transporting printed sheets along a UV or electron beam drier and a method for conveying printed sheets, which overcome the hereinafore-mentioned disadvantages of the heretofore-known cylinders and methods of this general type.

With the foregoing and other objects in view there is provided, in accordance with the invention, a cylinder for conveying printed sheets along a UV or electron beam drier, comprising inert-gas openings to which an inert gas is applied at least temporarily during operation.

With the objects of the invention in view, there is also provided a method for conveying printed sheets, which comprises drying the printed sheets in a drying operation using a UV or electron beam drier, conveying the printed sheets over a cylinder along the UV or electron beam drier, and discharging inert gas at least temporarily during the drying operation through inert-gas openings formed in the cylinder.

The cylinder of the invention allows the content of residual oxygen in the inertization space of the drier to be minimized, substantially preventing it from affecting the curing of the ink or varnish.

In accordance with another feature of the invention, the inert-gas openings are circumferential grooves or rows of holes extending in the circumferential direction of the cylinder.

In accordance with a further feature of the invention, the cylinder includes suction openings.

In accordance with an added feature of the invention, the suction openings are circumferential grooves or rows of nozzles/holes extending in the circumferential direction of the cylinder.

In accordance with an additional feature of the invention, a switching device is provided for switching a subset of the suction openings from being supplied with suction air to being supplied with an inert gas, the inert-gas openings being formed by suction openings that have been switched to inert-gas supply.

In accordance with yet another feature of the invention, the inert-gas openings form a row of inert-gas nozzles parallel to the cylinder axis.

In accordance with yet a further feature of the invention, the inert-gas nozzles are disposed in a cylinder gap of the cylinder that extends in parallel with the axis of the cylinder or in a circumferential cover of the cylinder gap.

In accordance with yet an added feature of the invention, the inert-gas nozzles are located between sheet grippers of the cylinder.

In accordance with yet an additional feature of the invention, a control device for supplying an inert gas to the inert-gas openings in accordance with a sheet-conveying cycle is provided.

In accordance with a concomitant feature of the invention, the control device is a valve device and the control device includes a cycle valve and a selection valve.

Other features which are considered as characteristic for the invention are set forth in the appended claims.

Although the invention is illustrated and described herein as embodied in a cylinder for conveying printed sheets along a UV or electron beam drier and a method for conveying printed sheets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
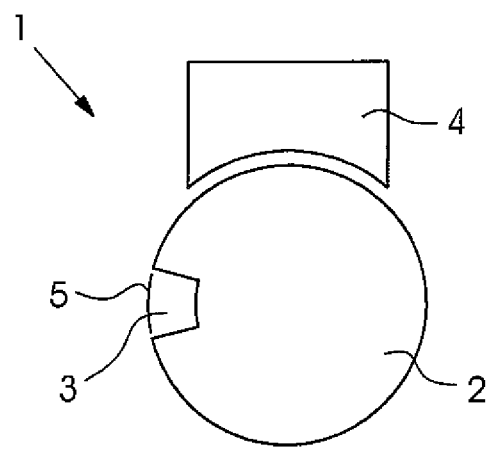
FIG. 1 is a diagrammatic, cross-sectional view of a sheet-conveying cylinder with an associated drier.
Figure 3:
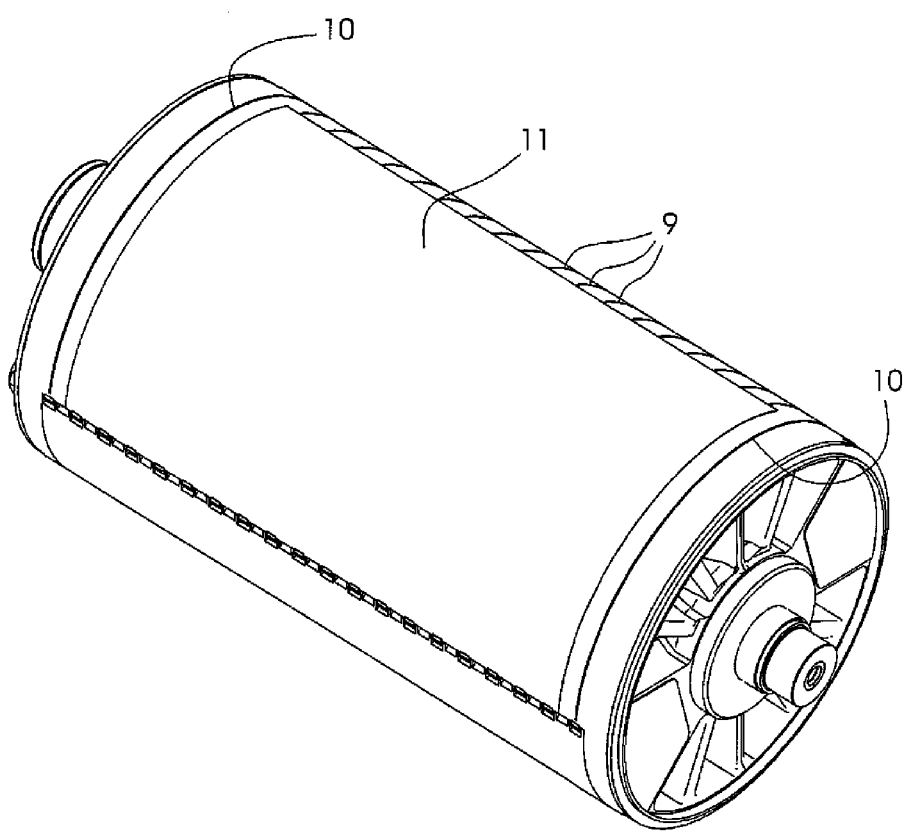
FIG. 3 is a perspective view of the cylinder with a sheet of printing material held thereon.

Referring now to the figures of the drawings in detail and first, particularly, to FIG. 1 thereof, there is seen a section of a printing press 1 for lithographic offset printing on printed sheets or signatures 11 (see FIG. 3). The section includes a cylinder 2 for conveying the printed sheets 11 and a drier 4 for drying the printed sheets 11 that are being conveyed on the cylinder 2. The drier 4 is a UV drier or an electron beam drier. The printing press 1 applies an ink or a layer of varnish to the printed sheet 11. The ink or varnish is subsequently cured in the drier 4 by UV or electron beams.

The drier 4 is formed of UV radiation or electron beam emitters, feed devices for supplying an inert gas to a space between the drier 4 and the cylinder 2 and seals for preventing the inert gas from leaking from the space and for preventing oxygen from infiltrating the space from the environment. The emitters are disposed between the feed devices as viewed in the conveying direction of the sheet 11, and the feed devices are disposed between the seals. For reasons of simplicity, emitters, feed devices, and seals are not shown in the drawing. The supplied inert gas is nitrogen.

The cylinder 2 has a cylinder body with a cylinder gap 3 in which sheet grippers 7 (see FIG. 2) for holding the printed sheets 11 are located. The cylinder gap 3 is largely covered by a circumferential cover 5.

Figure 2:
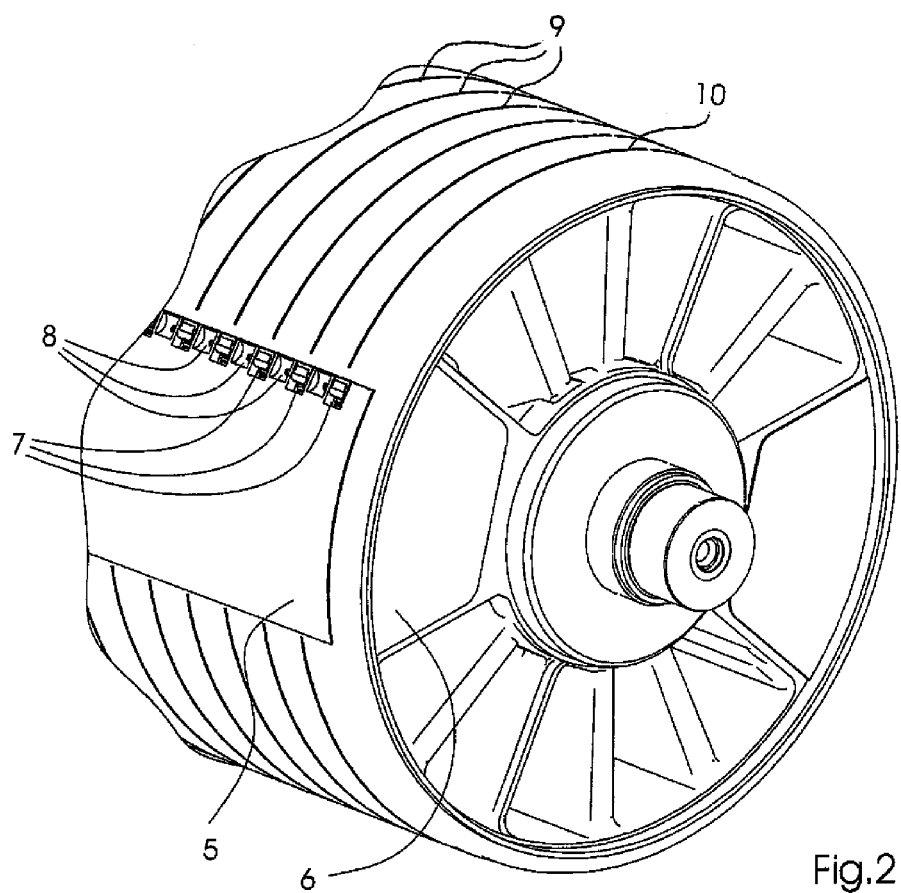
FIG. 2 is an enlarged, fragmentary, perspective view of the cylinder.

As shown in FIG. 2, the sheet grippers 7 are disposed in a row and protrude from the cylinder gap 3 through holes in the circumferential cover 5. Inert-gas nozzles 8 alternate between the sheet grippers 7 in the row. In addition to the circumferential cover 5, a lateral cover 6 is provided for the cylinder gap 3 on each of its two ends.

In FIG. 2, the printed sheet 11 conveyed by the cylinder 2 is not illustrated in order for a row of circumferential grooves 9, 10 in the cylinder body to be visible. The circumferential grooves 9, 10 are suction grooves and are used to hold the printed sheets 11 by providing a vacuum. Each circumferential groove 9, 10 extends in the circumferential direction of the cylinder 2 and the row of circumferential grooves 9, 10, like the row of sheet grippers 7 and the row of inert-gas nozzles 8 integrated therein, extends along the axial direction of the cylinder 2 across the width of the printing format.

FIG. 3 shows the cylinder 2 holding a printed sheet 11. The printed sheet 11 is clamped on its front edge by the sheet grippers 7 and, with the exception of the front edge needed for clamping, is held by suction along its entire sheet length by the circumferential grooves 9 located underneath the printed sheet 11.

It can be seen that not all of the provided circumferential grooves 9, 10 are located underneath the printed sheet 11 and covered by the latter. Depending on the respective format of the printed sheets 11, a larger or smaller number of circumferential grooves 10 is located outside the printed sheet 11 next to its side edges. One half of these non-covered circumferential grooves 10 is close to one cylinder end and the other half is close to the other cylinder end. In the illustrated exemplary embodiment, the printed sheet 11 is located between two non-covered circumferential grooves 10, one of which is on one cylinder end and the other of which is on the other cylinder end.

While suction air or a vacuum is applied to the covered circumferential grooves 9, an inert gas, which is nitrogen in the illustrated example, is applied to the non-covered circumferential grooves 10. As is the case with the inert-gas nozzles 8 (se FIG. 2), the inert gas is fed to these non-covered circumferential grooves 10 from the interior of the cylinder 2. By filling the non-covered circumferential grooves 10 with an inert gas, air or oxygen contained therein is prevented from entering the aforementioned space between the drier 4 and the cylinder 2 due to the rotation of the cylinder 2.

The space forms an inertization chamber in which the protective gas protects the radiation-curable coating on the printed sheet 11 against the effects of oxygen on the curing process while the coating is irradiated and cured.

Likewise, the fact that the recesses for the sheet grippers 7 in the circumferential cover 5 are filled with the inert gas prevents ambient air from infiltrating the space through these recesses.

Figure 4:
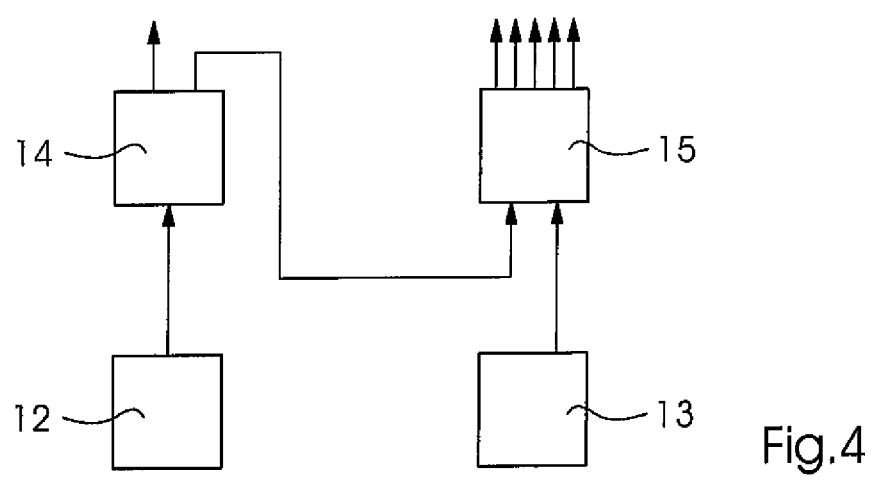
FIG. 4 is a block diagram of a control device for controlling an application of a vacuum and of an inert gas to the cylinder.

FIG. 4 illustrates a supply system applying suction air or a vacuum to the covered circumferential grooves 9 (see FIG. 3) and supplying the inert gas to the inert-gas nozzles 8. The supply system includes an inert-gas source 12 and a vacuum source 13. The inert-gas source 12 supplies the inert gas to a pulsed valve 14 that is connected to the inert-gas nozzles 8 on one hand and to a selection valve or switch 15 on the other hand. The circumferential grooves 9, 10 are connected to the selection valve 15. The selection valve 15 can be used to adjust the subset of circumferential grooves 9, 10 to which the vacuum from vacuum source 13 is applied—namely to those circumferential grooves 9 that are covered by the printed sheet—and the subset of circumferential grooves 9, 10 to which the inert gas is supplied by the pulsed valve 14, namely to those circumferential grooves 10 that are located outside the respective sheet format.

The pulsed valve 14 pulses the supply of inert gas in accordance with the conveying cycle of the printed sheets 11. In other words, in the case of a cylinder 2 that has two diametrical sheet-gripper systems, there will be two inert-gas pulses per cylinder revolution. The periodical opening and interruption of the inert-gas supply by using the pulsed valve 14 prevents the inert gas from being expelled from the inert-gas nozzles 8 and from the circumferential grooves 10 during that cylinder revolution phase in which the inert-gas nozzles 8 and the circumferential grooves 10 are not located opposite the drier 4 (see FIG. 1). This saves inert gas. Alternatively, the pulsed valve 14 might operate in such a way that the inert gas is supplied to the inert-gas openings, i.e. the non-covered circumferential grooves 10 and the inert-gas nozzles 8 of the cylinder 2, shortly before they enter the drying chamber or space between the drier 4 and the cylinder 2 in the course of the rotation of the cylinder 2.

The supply device shown in FIG. 4 may be connected to the cylinder 2 by a rotary valve or a rotary joint. The rotary joint transmits the inert-gas stream from the stationary supply device external to the cylinder to the rotating cylinder 2 and the suction-air stream from the rotating cylinder 2 to the supply device that is external to the cylinder 2 and does not co-rotate with the latter.

In accordance with a modified embodiment that is not shown in the drawing, each of the circumferential grooves 9, 10 is replaced by a row of nozzles or openings. Like the circumferential grooves 9, 10, these rows of nozzles extend in the circumferential direction of the cylinder 2 and have the same function, i.e. they hold the printed sheet by suction where the nozzles are covered by the printed sheet and expel inert gas where the nozzles are not covered by the printed sheet. The nozzles are accordingly supplied with suction air and inert gas by the supply device shown in FIG. 4.

The invention claimed is:

1. A cylinder for conveying printed sheets, the cylinder comprising:
   a cylinder body configured to convey the sheets along a UV or electron beam drier, said cylinder body having inert-gas openings formed therein configured to discharge the inert gas at least temporarily during operation; and
   a controller configured to supply inert gas to said inert-gas openings in accordance with a sheet-conveying cycle, said controller being a valve device including a pulsed valve and a selection valve.

2. The cylinder according to claim 1, wherein said inert-gas openings include circumferential grooves or rows of holes extending in a circumferential direction of said cylinder body.

3. The cylinder according to claim 1, wherein said cylinder body has suction openings formed therein.

4. The cylinder according to claim 3, wherein said suction openings are circumferential grooves or rows of holes extending in circumferential direction of said cylinder body.

5. The cylinder according to claim 3, which further comprises:
   a switch configured to switch a subset of said suction openings from suction-air supply to inert-gas supply;
   said inert-gas openings including suction openings having been switched to inert-gas supply.

6. The cylinder according to claim 1, wherein said inert-gas openings include a row of inert-gas nozzles being parallel to an axis of the cylinder.

7. The cylinder according to claim 6, which further comprises:
   a cylinder gap extending parallel to said cylinder axis;
   said inert-gas nozzles being disposed in said cylinder gap.

8. The cylinder according to claim 6, which further comprises:
   a cylinder gap; and
   a circumferential cover covering said cylinder gap;
   said inert-gas nozzles being disposed in said circumferential cover.

9. The cylinder according to claim 6, which further comprises sheet grippers, said inert-gas nozzles being located between said sheet grippers.

10. A method for conveying printed sheets, the method comprising the following steps:
    drying the printed sheets in a drying operation using a UV or electron beam drier;
    conveying the printed sheets over a cylinder along the UV or electron beam drier;
    discharging inert gas at least temporarily during the drying operation through inert-gas openings formed in the cylinder;
    supplying inert gas to the inert-gas openings in accordance with a sheet-conveying cycle by using a controller; and
    providing the controller as a valve device including a pulsed valve and a selection valve.

11. The method according to claim 10, which further comprises providing at least some of the inert-gas openings as circumferential grooves or rows of holes extending in circumferential direction of the cylinder.

12. The method according to claim 10, which further comprises forming suction openings in the cylinder body.

13. The method according to claim 12, which further comprises providing the suction openings as circumferential grooves or rows of holes extending in a circumferential direction of the cylinder body.

14. The method according to claim 12, which further comprises:
    switching a subset of the suction openings from suction-air supply to inert-gas supply using a switch;
    the inert-gas openings including suction openings having been switched to inert-gas supply.

15. The method according to claim 10, which further comprises providing at least some of the inert-gas openings as a row of inert-gas nozzles being parallel to an axis of the cylinder.

16. The method according to claim 15, which further comprises:
    forming a cylinder gap extending parallel to the cylinder axis; and
    locating the inert-gas nozzles in the cylinder gap.

17. The method according to claim 15, which further comprises:
    forming a cylinder gap;
    covering the cylinder gap with a circumferential cover; and
    locating the inert-gas nozzles in the circumferential cover.

18. The method according to claim 15, which further comprises providing sheet grippers, and locating the inert-gas nozzles between the sheet grippers.

* * * * *